US005228708A

United States Patent [19]

Verdugo

[11] Patent Number: 5,228,708

[45] Date of Patent: Jul. 20, 1993

[54] WALKER AND EXERCISE APPARATUS FOR FUNCTIONAL RECOVERY

[76] Inventor: Isabel Verdugo, Claveri, 18, 3º 4ª, 0891 *Rubi (Barcelona), Spain*

[21] Appl. No.: 764,354

[22] Filed: Sep. 23, 1991

[30] Foreign Application Priority Data

Sep. 28, 1990 [ES] Spain .................................. 9002774

[51] Int. Cl.[5] .............................................. B62K 11/00

[52] U.S. Cl. .................................. 280/200; 280/293; 280/87.021; 135/67; 482/66

[58] Field of Search ....................... 135/65, 67, 71, 72, 135/85, 66; 297/5-7; 482/66, 68; 280/87.021, 87.051, 304.1, 200, 293

[56] References Cited

U.S. PATENT DOCUMENTS

| | | | |
|---|---|---|---|
| 3,195,550 | 7/1965 | Ingalls et al. | 135/67 |
| 3,778,052 | 12/1973 | Andow et al. | 297/5 X |
| 4,272,071 | 6/1981 | Bolton | 135/67 X |
| 4,342,465 | 8/1982 | Stillings | 135/67 X |
| 4,415,198 | 11/1983 | Brearley | 297/6 |
| 5,040,556 | 8/1991 | Raines | 135/67 |
| 5,050,862 | 9/1991 | Saghafi | 297/5 X |

FOREIGN PATENT DOCUMENTS

| | | | |
|---|---|---|---|
| 846538 | 9/1939 | France | 297/5 |

*Primary Examiner*—Carl D. Friedman
*Assistant Examiner*—Lan M. Mai
*Attorney, Agent, or Firm*—Wells, St. John, Roberts, Gregory & Matkin

[57] ABSTRACT

The present apparatus consists of a frame with a tubular structure, made of the following elements: a number of vertical studs supporting atop cushioned member of a nearly circular shape, the studs rest on a lower frame component having the same bowed shape and a number of casters with braking devices. The frame is selectively completed by a bow-shaped component also cushioned and with fastening means at it sends to allow mounting to the cushioned member. The apparatus also includes a removable an d interchangeable square-shaped seat and a cross-shaped seat having detachable fastening elements, respectively, in relation to ring-shaped pieces in the studs. A flexible and non-extensible band is also provided to be attached to the rings and to surround the body of the user.

4 Claims, 2 Drawing Sheets

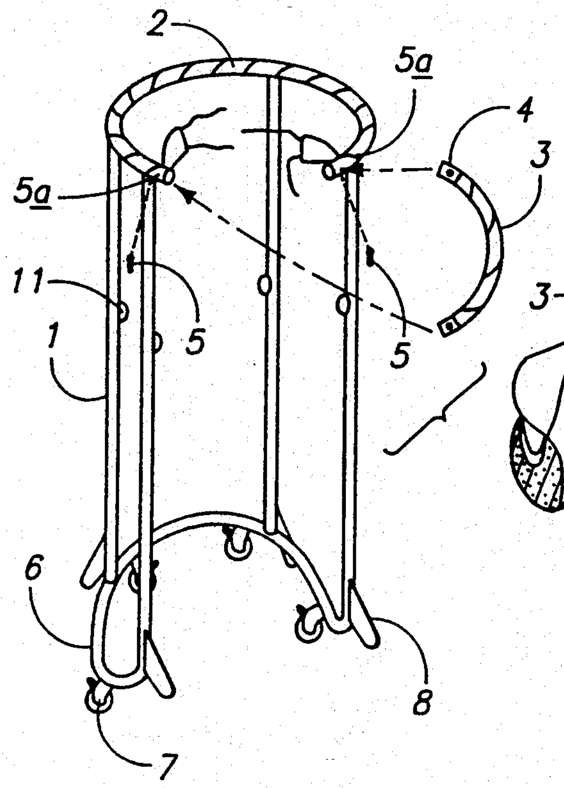
Fig 1
Fig 1A
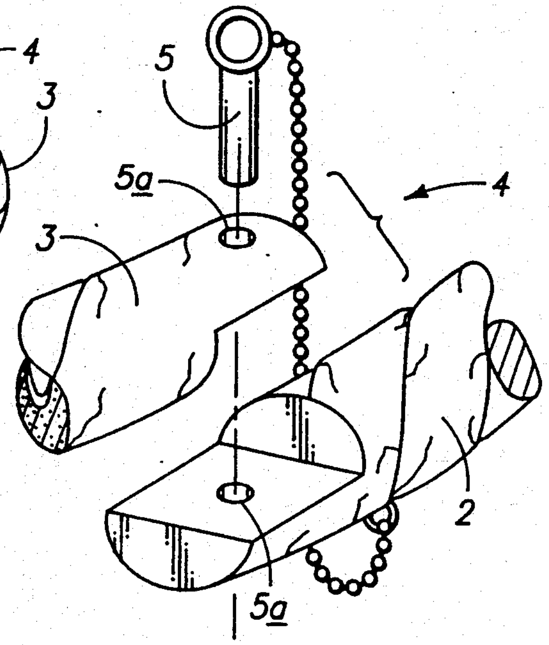
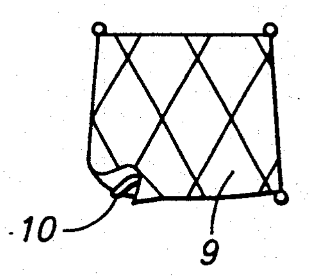
Fig 2
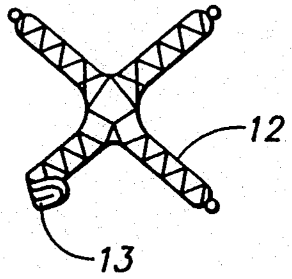
Fig 3
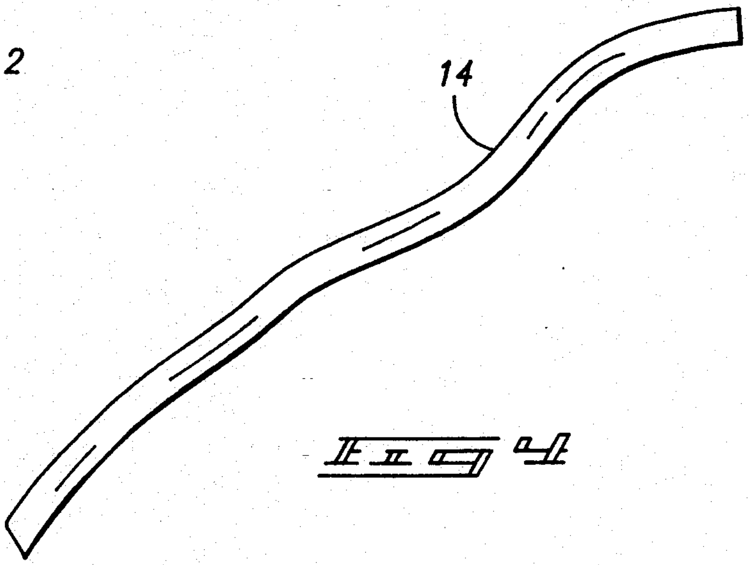
Fig 4

WALKER AND EXERCISE APPARATUS FOR FUNCTIONAL RECOVERY

TECHNICAL FIELD

The present invention relates to an apparatus for functional recovery of people form disabilities which prevent them, at least temporarily, from walking without assistance from another.

BACKGROUND OF THE INVENTION

Many people, especially the elderly, suffer illnesses or injury that impairs their ability to move about without assistance, at least in getting to a standing position and then sitting down. Such infirmities therefore cause extended bedridden terms during which sores and other effects may be caused as a consequence o bad circulation o blood. The long-term bedridden patient must therefore be moved constantly, increasing the cost of care without decreasing the time of recovery. This also makes it difficult to proceed with the recovering exercises which the injured persons could otherwise do on their own.

Using the apparatus herein described allows people temporarily disabled or the otherwise ambulatory impaired to exercise the body functions which enhance the blood circulation, without needing assistance from another. With the present apparatus, many otherwise bedridden patients are enabled to get up from bed or form their seat without the need of another person. They are then able to walk and proceed with their exercises. The dimensions of the apparatus allow the users to walk without any difficulty through a door.

BRIEF DESCRIPTION OF THE DRAWINGS

A preferred embodiment of the invention is described below with reference to the accompanying drawings, which are briefly described below.

FIG. 1 shows a partially exploded perspective view of the present apparatus in a walker mode;

FIG. 1*a* is an enlarged exploded fragmentary view of an interfitting fastener means;

FIGS. 2–4 show accessories mountable to the apparatus to afford various forms of support to a patient;

DETAILED DESCRIPTION OF THE PREFERRED EMBODIMENTS

The apparatus for functional recovery, which is the subject matter of this application as exemplified herein, includes a series of upright studs 1, for example, four in number, of a metallic tubular structure, which in their top ends mount a semi-annular or incomplete round shaped cushioned member 2 of "C" shape in top view. The member 2 is cushioned by conventional padding.

Figure 6:
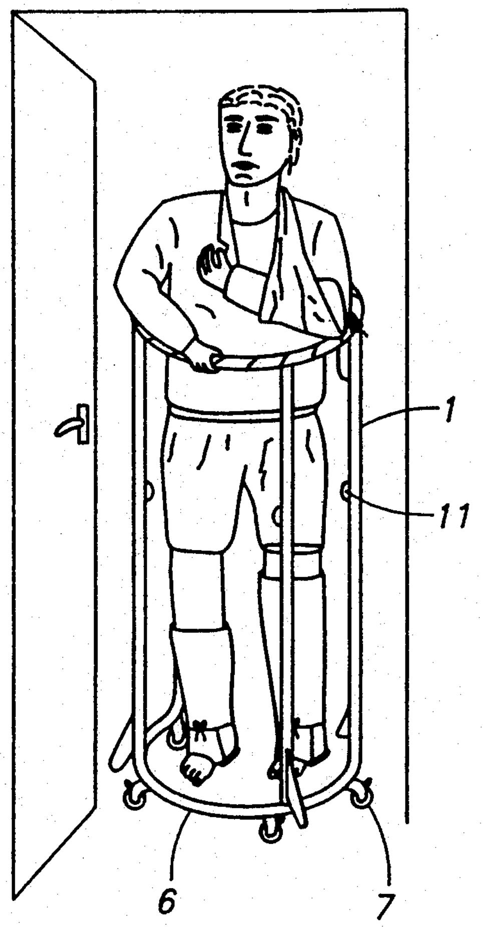
FIG. 6 shows another use of the apparatus in a walking mode.
Figure 7:
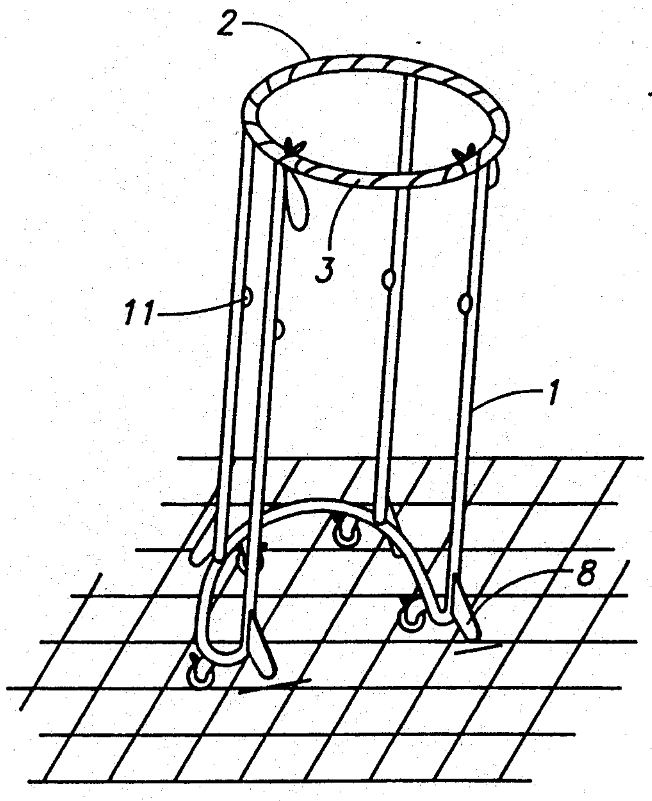
FIG. 7 shows the apparatus in an inclined position, to enable the patient entry and to prevent the patient from falling when moving about with the apparatus.

Cushioned member 2 is selectively closed, forming a complete circular shape by a curved element 3 (FIGS. 1, 1*a*). Element 3 provides at its ends, a means 4, for its coupling at the ends of cushioned member 2. Means 4 may be comprised of complementary interfitting detachable fastening means which can consist of pins 5 and apertures 5*a* (FIG. 1*a*) in the member 2 and element 3 that may be aligned to receive the pins 5 (FIGS. 6, 7). Bolts, buckles, hooks, or other forms of fasteners may also be used in place of pins 5. The completed head or top of the apparatus including member 2 and element 3 thus becomes a round and cushioned part to encircle and provide support and gripping surfaces to the user.

Lower ends of the studs 1 are fixed to another incomplete or semicircular shaped lower frame member 6. conventional forms of brake-type casters 7 are mounted to frame member 6 to enable selective movement as a walker. The caster brakes may be set to facilitate mounting and dismounting. Outrigger parts 8 extend angularly from the studs, slanting downwardly without touching the ground when the apparatus is in a vertical position. When the apparatus is tipped, as shown in FIG. 7, the outriggers engage the ground or floor and serve as means to brace the apparatus temporarily as the patient gets in or out from the frame enclosure, thus avoiding a potential fall.

Figure 5:
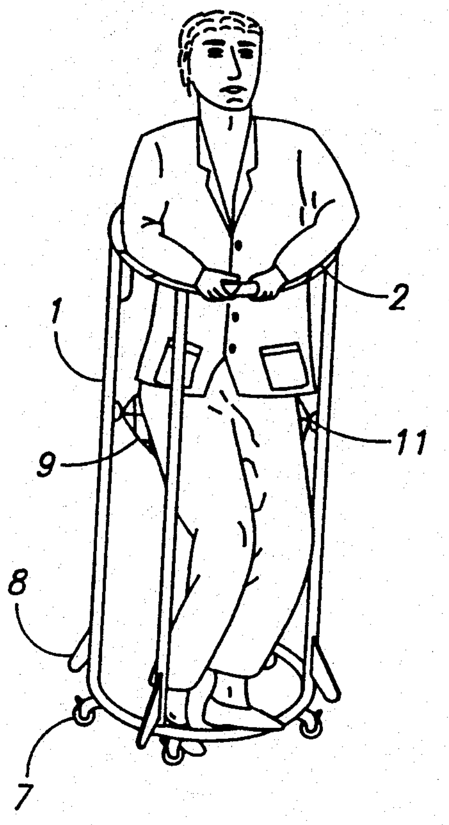
FIG. 5 shows a patient positioned in the apparatus and with the apparatus arranged in a walking or sitting mode.

A variety of usage of the apparatus is facilitated with the accessories represented in FIGS. 2–4. The flexible cushioned square shaped seat 9 (FIGS. 2 and 5) present at its corners and on its lower face means 10 of a separable connection, such as hooks, bolts, fasteners, etc., that may be selectively secured to rings 11 fixed approximately mid-height on the studs 1, as can be seen in FIG. 5. Such seat 9 allows the user to rest sitting down in the apparatus and to move different body parts. The user is able to selectively move about by pushing or pulling with the feet while remaining seated.

Another seat member 12 (FIG. 3) is cross-shaped, is also cushioned, flexible, and has a fastening means 13 at its ends to be releasably secured to respective ring members 11. Seat member 12 acts as a sling, allowing leg movement as in walking upright and sitting.

A band 14 (FIG. 4) is made of a flexible and nonextensible material and is provided as a wrap in order to surround the body of the user and be fastened to the apparatus. The band may be threaded through the rings 11 of the studs. The band 14 may thus be selectively used to secure the body of the user while also functioning as a set or sling to allow walking and resting on the same band 14.

As illustrated in FIGS. 1 and 6, the apparatus can also be used simply as a walker without a seat or strap.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. Apparatus for functional recovery, comprising:

a frame defined by a number of upright studs;

wherein the upright studs include top ends and bottom ends;

a cushioned top member joined to the top ends of the studs and having an incomplete round shape;

a lower frame ember of incomplete circular shape joined to the bottom ends of the studs;

casters mounted to the lower frame member for rolling engagement with a support surface such as a floor;

a cushioned curved element for completing the incomplete round shape of the cushioned top member;

detachable fastening means for releasably securing the curved element to the cushioned top member; and outrigger means on the frame adjacent the bottom end of each stud and extending downwardly and outwardly of the frame an casters, each of said outrigger means having an outrigger end spaced downwardly from the lower frame member and elevationally above the support surface such that the outrigger ends will engage the support surface and brace the frame against falling when tipped from an upright substantially vertical position.

2. Apparatus for functional recovery, according to claim 1, further comprising:

a flexible, cushioned and substantially square-shaped seat;

connectors on the substantially square-shaped seat; and ring members on the studs for releasably receiving the connectors.

3. Apparatus for functional recovery, according to claim 1, further comprising:

a flexible, cushioned and cross-shaped seat member;

seat fastening means on the cross-shaped seat member; and ring members on the studs for releasably receiving the seat fastening means.

4. Apparatus for functional recovery, according to claim 1, further comprising:

ring members mounted to the studs;

a flexible and non-extensible band means for securing the body of the user and for insertion through the ring members.

* * * * *